United States Patent
Lee et al.

(10) Patent No.: US 9,535,551 B2
(45) Date of Patent: Jan. 3, 2017

(54) MUTUAL CAPACITANCE TOUCH SENSITIVE SENSING APPARATUS AND SYSTEM AND METHOD THEREOF

(71) Applicants: APEX MATERIAL TECHNOLOGY CORP., Keelung (TW); IMAGINATION BROADWAY LTD., New Taipei (TW)

(72) Inventors: Shang-Li Lee, Keelung (TW); Zong-Bin Liao, Keelung (TW)

(73) Assignees: APEX MATERIAL TECHNOLOGY CORP., Keelung (TW); IMAGINATION BROADWAY LTD., New Taipei (TW)

( * ) Notice: Subject to any disclaimer, the term of this patent is extended or adjusted under 35 U.S.C. 154(b) by 82 days.

(21) Appl. No.: 14/556,629

(22) Filed: Dec. 1, 2014

(65) Prior Publication Data
US 2016/0154497 A1    Jun. 2, 2016

(30) Foreign Application Priority Data
Apr. 3, 2014 (TW) ................. 103112485

(51) Int. Cl.
*G06F 3/045* (2006.01)
*G06F 3/044* (2006.01)

(52) U.S. Cl.
CPC .................... *G06F 3/044* (2013.01)

(58) Field of Classification Search
CPC ......... G06F 3/044; G06F 3/045; G06F 3/0412
USPC ..................... 345/173–179; 178/18.01–18.04
See application file for complete search history.

(56) References Cited

U.S. PATENT DOCUMENTS

| | | | | |
|---|---|---|---|---|
| 8,928,603 B2 * | 1/2015 | Han | ................. | G06F 3/044 178/18.01 |
| 2009/0002338 A1 * | 1/2009 | Kinoshita | ............... | G06F 3/045 345/174 |
| 2009/0322704 A1 * | 12/2009 | Anno | .................. | G06F 3/044 345/174 |
| 2014/0375598 A1 * | 12/2014 | Shen | .................. | G06F 3/044 345/174 |
| 2015/0331504 A1 * | 11/2015 | Chen | .................. | G06F 3/046 345/174 |

FOREIGN PATENT DOCUMENTS

TW        M352721        3/2009

* cited by examiner

*Primary Examiner* — Kimnhung Nguyen
(74) *Attorney, Agent, or Firm* — WPAT, PC; Justin King

(57) ABSTRACT

The present invention provides a mutual capacitance touch sensitive sensing method, including: sequentially charging multiple driving electrode sets and detecting the electrical change of multiple sensing electrodes; sequentially charging multiple driving electrodes in a driving electrode set and detecting the electrical change of the sensing electrodes when the electrical change of at least one of the sensing electrodes is detected while driving the driving electrode set; and determining the touch location according to the detected electrical change.

19 Claims, 15 Drawing Sheets

MUTUAL CAPACITANCE TOUCH SENSITIVE SENSING APPARATUS AND SYSTEM AND METHOD THEREOF

RELATED APPLICATIONS

This application claims priority to Taiwan patent application, No. 103112485, filed on Apr. 3, 2014, entitled "MUTUAL CAPACITANCE TOUCH SENSITIVE SENSING APPARATUS AND SYSTEM AND METHOD THEREOF", which is hereby incorporated by reference in its entirety.

BACKGROUND OF THE INVENTION

Technical Field

The present invention relates to a touch sensing method. More particularly, the present invention relates to a mutual capacitance touch sensitive sensing method.

Description of Related Art

Touch sensitive panel is one of the major human-machine interfaces nowadays, especially the mutual capacitance touch sensing panel that can provide better sensing accuracy. Please refer to FIG. 1, which is a perspective view of a conventional mutual capacitance touch sensing system 100. The touch sensing system 100 includes multiple first electrodes (or driving electrode lines) 120 and multiple second electrodes (or sensing electrode lines) 130 which are disposed in a touch sensing region. These first and second electrodes 120 and 130 are both connected to a sensing apparatus 110. The sensing apparatus 110 transmits the detected touch event information to other circuits or modules (e.g. the main processor of a computer system) via other interfaces.

Several areas, where the first electrodes 120 overlap but are not in contact with the second electrodes 130, exists between the first and the second electrodes 120 and 130. During one scanning cycle of the touch sensing region, the sensing apparatus 110 sequentially charges the first electrodes 120 to send driving signal, and then charges the second electrodes 130 to conduct touch sensing. When a certain first electrode 120 is charged and the electrical change is detected on a certain second electrode 130, the sensing apparatus 110 could then determine that the touch event takes place in the area or near the area where the certain first electrode 120 overlaps the certain second electrode 130.

In order to scan all the areas in the touch sensing region in one scanning cycle, each of the first electrodes 120 must be charged once sequentially. Assuming that the second electrodes 130 conducting touch sensing simultaneously requires time t, and the number of the first electrodes 120 is M, then the total time of one scanning cycle of the touch sensing region would be M multiplying t. Meanwhile, due to the users' increasing requirements for touch sensing efficiency, the sensing apparatus 110 has to respond to the system more and more frequently. As a result, there is a demand in the market for a touch sensing method and system that could decrease the time for scanning the touch sensing region and increase the touch report rate.

SUMMARY

According to one embodiment of the present invention, a mutual capacitance touch sensing method is provided. The method at least includes the following steps: sequentially charging multiple driving electrode sets and detecting the electrical change of multiple sensing electrodes, and each driving electrode set includes multiple driving electrodes; when a first driving electrode set is charged and the electrical change of at least one of the sensing electrodes is detected, sequentially charging the driving electrodes in the first driving electrode set and detecting the electrical change of the sensing electrodes; and determining a touch location according to the detected electrical change of the sensing electrodes when the driving electrodes in the first driving electrode set are sequentially charged.

According to another embodiment of the invention, a mutual capacitance touch sensing apparatus is provided. The apparatus is used for detecting a touch location on a mutual capacitance touch panel. The mutual capacitance touch panel includes multiple driving electrode sets and multiple sensing electrodes corresponding to the driving electrode sets. Each one of the driving electrode sets includes multiple driving electrodes. The mutual capacitance touch sensing apparatus includes a sensing module which is connected to the driving electrode sets and the sensing electrodes. The sensing module is used for performing the steps at least including: sequentially charging the driving electrode sets and detecting the electrical change of the sensing electrodes; when a first driving electrode set is charged and the electrical change of at least one of the sensing electrodes is detected, sequentially charging the driving electrodes in the first driving electrode set and detecting the electrical change of the sensing electrodes; and determining the touch location according to the detected electrical change of the sensing electrodes when the driving electrodes in the first driving electrode set are sequentially charged.

According to a further embodiment of the present invention, a mutual capacitance touch sensing system is provided. The system includes the above-mentioned mutual capacitance touch panel and the above-mentioned mutual capacitance touch sensing apparatus.

It is to be understood that both the foregoing general description and the following detailed description are by examples only. They are not intended to limit the scope of the present invention as claimed.

BRIEF DESCRIPTION OF DRAWINGS

The present invention could be more fully understood by reading the following detailed description of the embodiment with reference to the accompanying drawings as follows.

DETAILED DESCRIPTION

Reference will now be made in detail to the present embodiments of the present invention with the accompanying drawings. It should be noted that the method steps according to the embodiments of the present invention are not limited to their order shown in the detailed description, unless their order has dependency relationship specifically described. A person of ordinary skill in the art could adjust the order of the method steps or insert one or more steps between the method steps without departing from the spirit of the present invention, and other embodiments derived therefrom would still be regarded as falling into the scope of the present invention.

Figure 2:
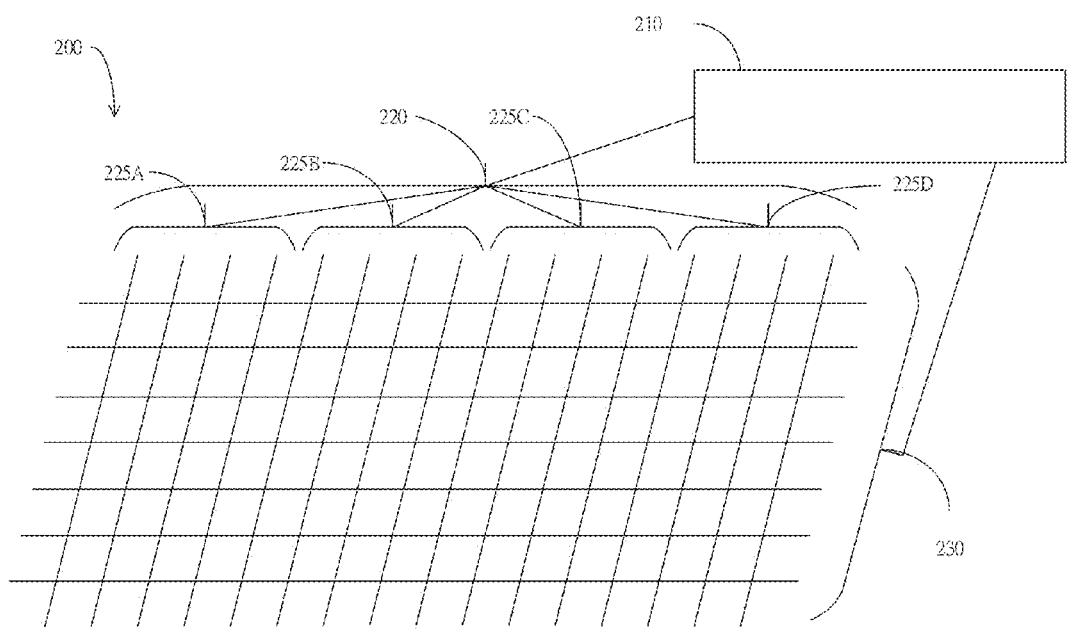
FIG. 2 is a perspective view of a mutual capacitance touch sensing system according to one embodiment of the present invention.

Please refer to FIG. 2, which is a perspective view of a mutual capacitance touch sensing system 200 according to one embodiment of the present invention. The mutual capacitance touch sensing system 200 includes multiple first electrodes or driving electrodes 220, and multiple second electrodes or sensing electrodes 230. The driving and the sensing electrodes 220, 230 are connected to a mutual capacitance touch sensing apparatus 210. The touch sensing apparatus 210 further transmits, via other interfaces, the detected touch event information to other circuits or modules (e.g. the main processor of a computer system).

The driving electrodes 220 overlap but are not in contact with the sensing electrodes 230 in several areas that exist between the driving and the sensing electrodes 220, 230. The embodiment of FIG. 2 is different from the system of FIG. 1 in that the driving electrodes 220 are divided into multiple driving electrode sets 225. More specifically, as in the embodiment shown in FIG. 2, every four of the driving electrodes 220 are grouped into one driving electrode set 225, and there are totally four driving electrode sets 225A to 225D. Except the first driving electrode set 225A, every initial driving electrode 220 in each of the driving electrode sets 225B, 225C and 225D is adjacent to the last driving electrode 220 in the previous driving electrode set 225A, 225B or 225C respectively. A person of ordinary skill in the art can understand that although four driving electrode sets 225A to 225D and four driving electrodes 220 in each one of the driving electrode sets 225A to 225D are depicted in FIG. 2, the number of the driving electrode sets and the number of driving electrodes in each set are not limited to the present embodiment of the present invention.

Figure 3:
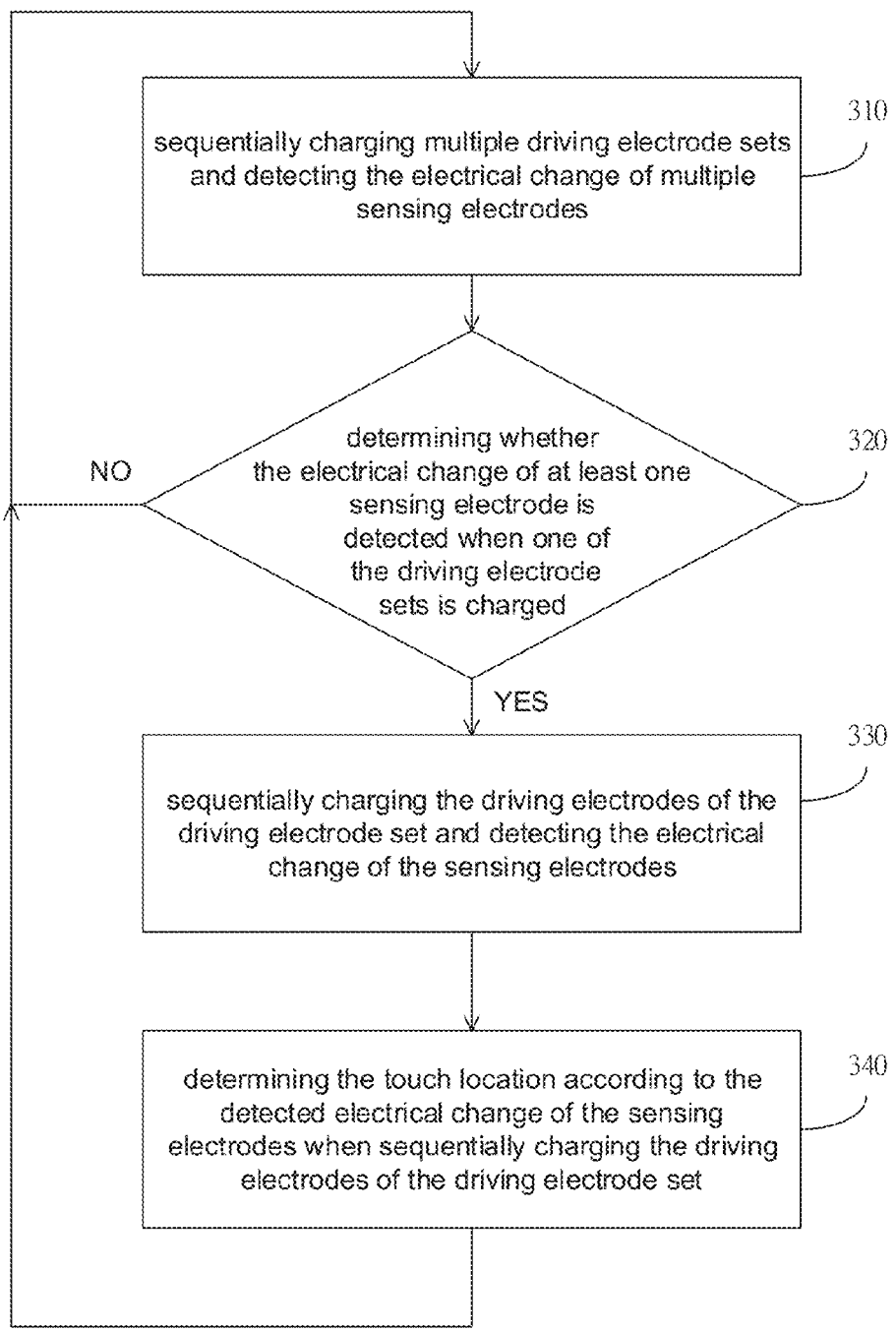
FIG. 3 is a flow chart of a mutual capacitance touch sensing method according to one embodiment of the present invention.
Figure 4A:
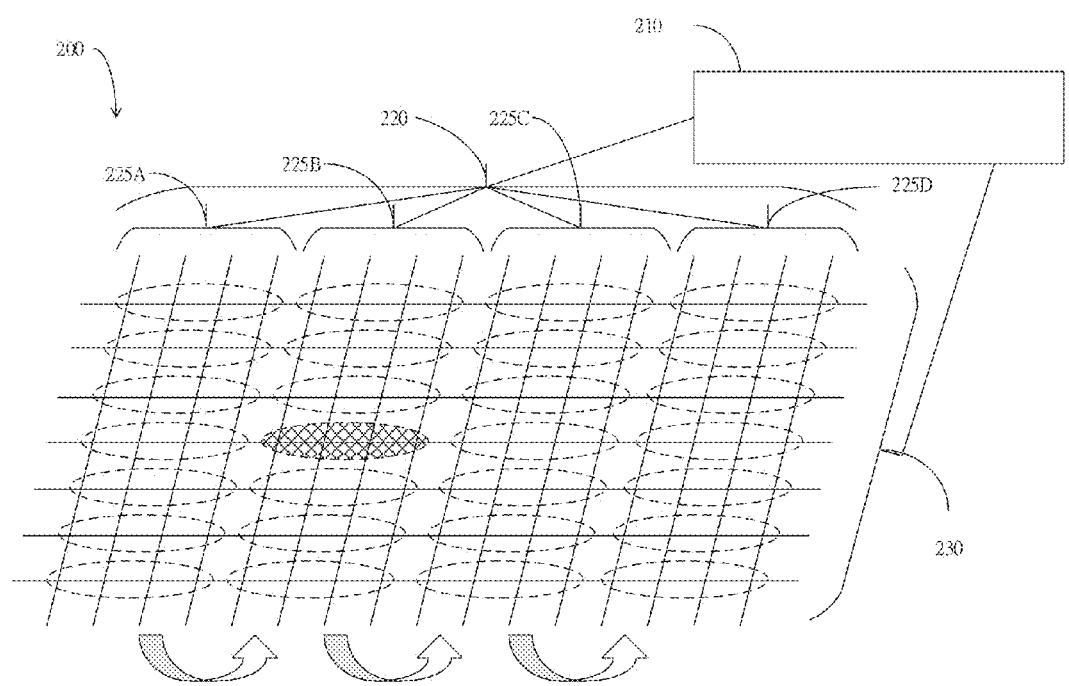
FIG. 4A is a perspective view of the mutual capacitance touch sensing system of FIG. 2 in the state of performing step 310 of FIG. 3.

Please refer to FIG. 3, showing a flow chart of a mutual capacitance touch sensing method according to one embodiment of the present invention. The step of sequentially charging the driving electrode sets and detecting the electrical change of the sensing electrodes is performed in step 310. Please refer to FIG. 4A, which is a perspective view of the mutual capacitance touch sensing system of FIG. 2 in the state of performing step 310 of FIG. 3. In the present embodiment, the touch sensing apparatus 210 sequentially charges the driving electrode sets 225A, 225B, 225C and 225D. When one driving electrode set 225A, 225B, 225C or 225D, taking the second driving electrode set 225B for example, is charged and the electrical change of one sensing electrode 230 is detected, it means an external conductive object is in proximity to or in contact with the four areas where the second driving electrode set 225B overlaps the sensing electrode 230. The four areas are depicted in FIG. 4A as the ellipse area filled with solid lines.

In the following step 320, determining whether the electrical change of at least one of the sensing electrodes 230 is detected or not when any one of the driving electrode sets 225A to 225D is charged. As mentioned above, when the second driving electrode set 225B is charged and the electrical change of one sensing electrode 230 is detected, the method continues to step 330. On the contrary, when none of the electrical change is detected as any one of the driving electrode sets 225A to 225D is charged, the method returns to the beginning and repeats step 310.

Figure 4B:
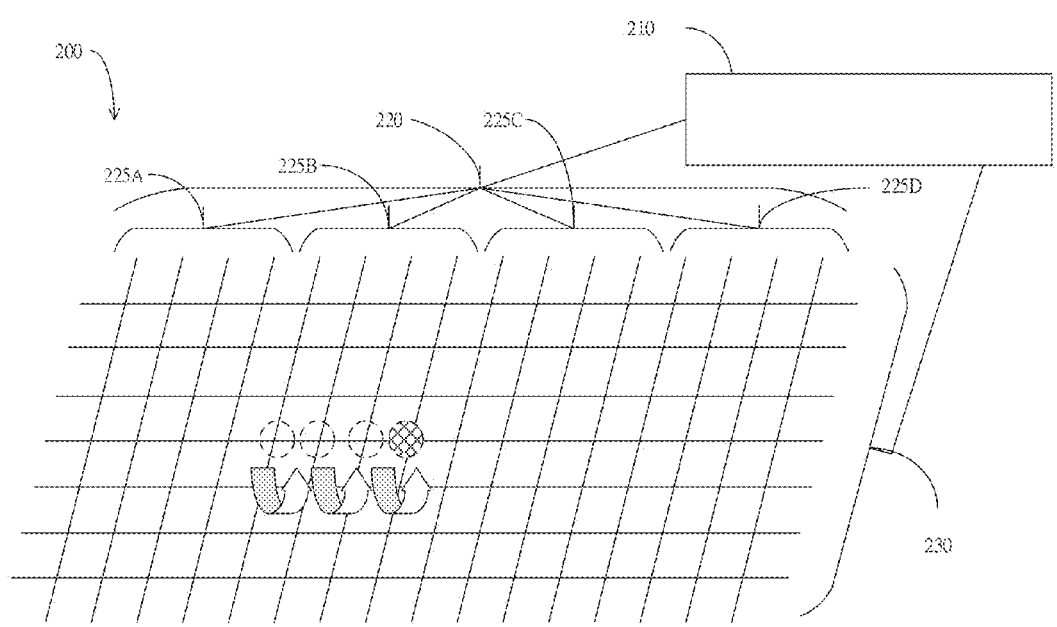
FIG. 4B is a perspective view of the mutual capacitance touch sensing system of FIG. 2 in the state of performing step 330 of FIG. 3.

In step 330, the step of sequentially charging the driving electrodes 220 in the driving electrode set 225 and detecting the electrical change of the sensing electrodes 230 is performed. Please refer to FIG. 4B, which is a perspective view of the mutual capacitance touch sensing system of FIG. 2 in the state of performing step 330 of FIG. 3. As shown in the embodiment of FIG. 4A, the second driving electrode set 225B is charged and the electrical change is detected. Therefore in step 330, only the four driving electrodes 220 in the second driving electrode set 225B need to be sequentially charged, and detect the electrical change of the sensing electrodes 230.

The method continues to step 340 of FIG. 3. The touch location, e.g. the location of the external conductive object, is determined according to the detected electrical change of the sensing electrodes 230 when sequentially charging the driving electrodes 220 of the second driving electrode set 225B.

Figure 1:
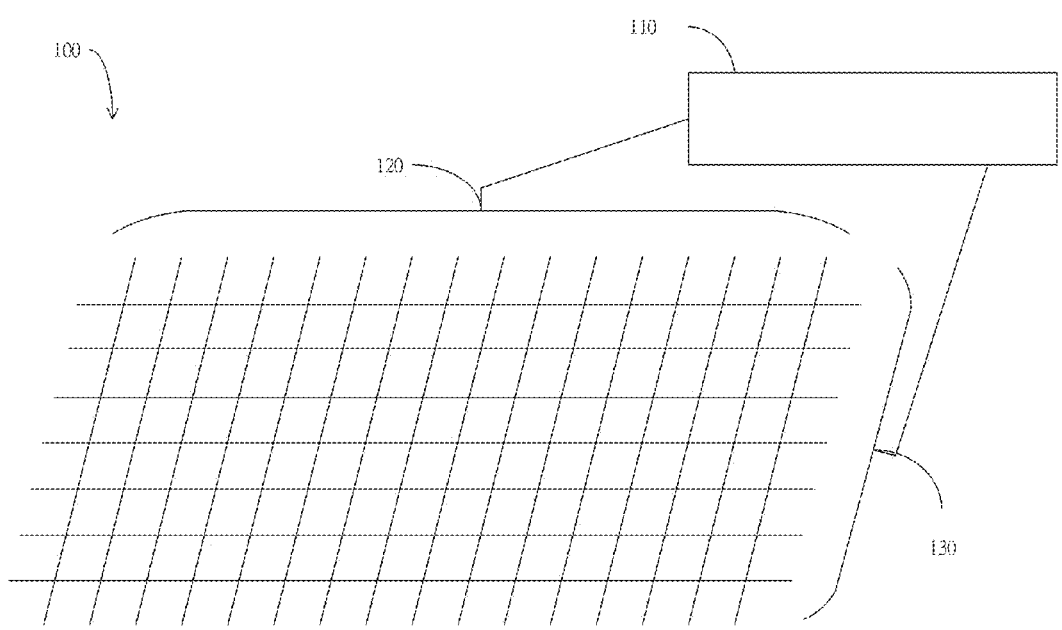
FIG. 1 is a perspective view of a conventional mutual capacitance touch sensing system.

In the conventional sensing method of FIG. 1, in order to perform one location calculation (or one location reporting), all the sixteen driving electrodes 110 are required to be charged in sequence, and it takes sixteen unit times. Using the embodiment shown in FIG. 3, in the examples of FIG. 4A, and FIG. 4B, four driving electrode sets 225A to 225D are charged in step 310, and four driving electrodes 220 of the second driving electrode set 225B are charged in step 330. It only takes eight unit times to perform one location calculation (or one location reporting).

Figure 5A:
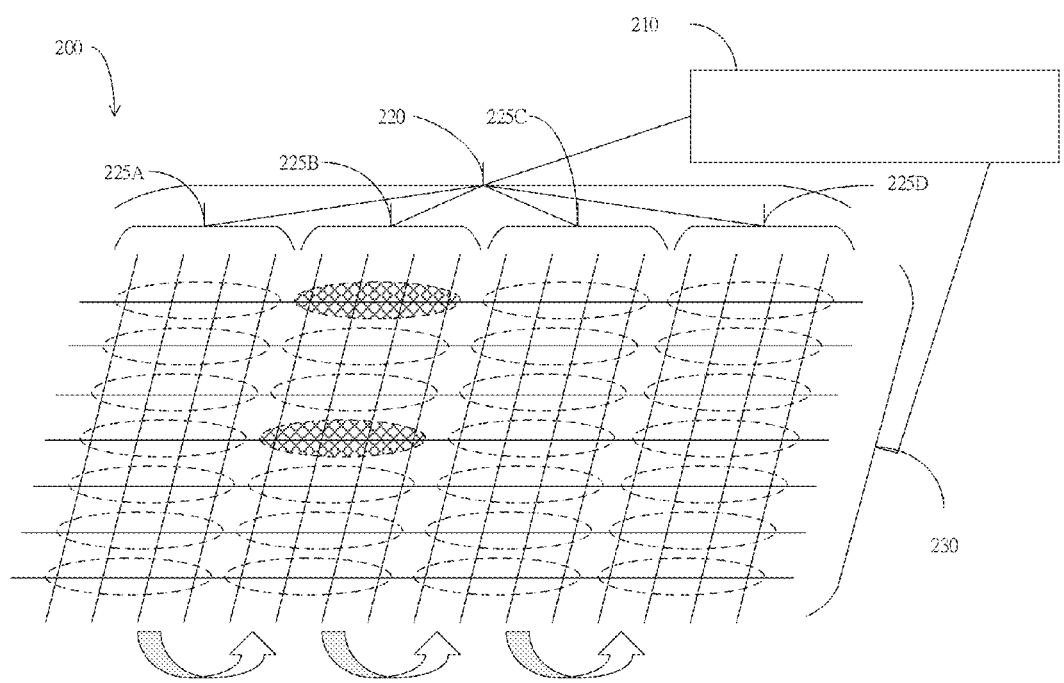
FIG. 5A and FIG. 5B are perspective views of one embodiment of the present invention.
Figure 5B:
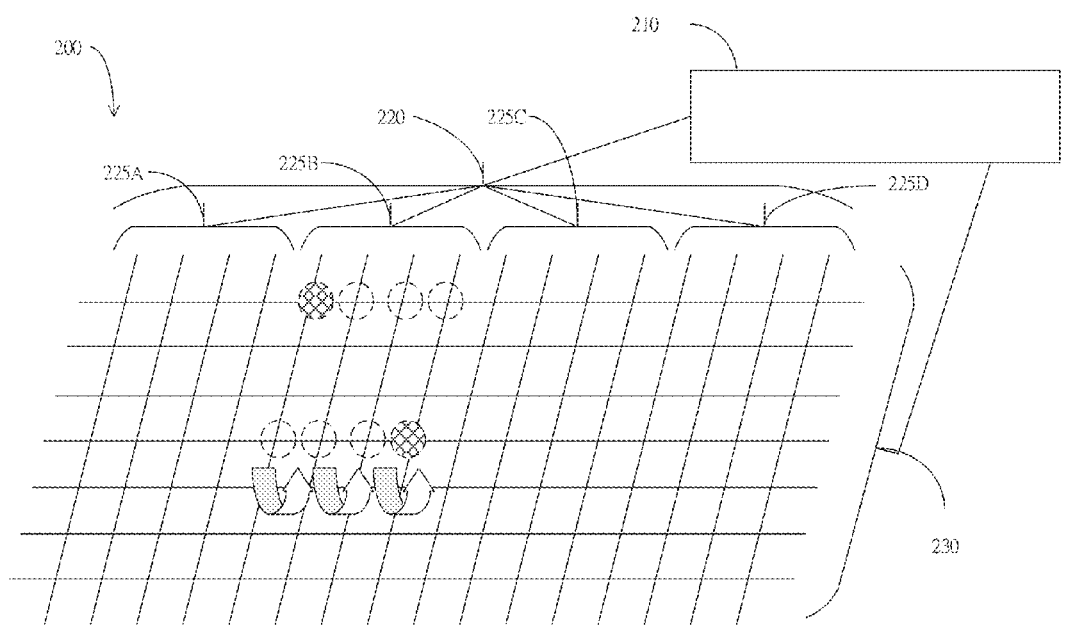

Please refer to FIG. 5A and FIG. 5B, which are perspective views of one embodiment of the present invention. This embodiment is different from the embodiment shown in FIG. 4A and FIG. 4B in that more than one touch location could be determined in this embodiment. When the electrical change of more than one sensing electrode 230 is detected in step 310 while charging the second driving electrode set 225B, the four driving electrodes 220 of the second driving electrode set 225B are charged sequentially in step 330. As a result, the electrical change of two sensing electrodes 230 can be detected and the touch locations of two external conductive objects can be determined accordingly in step 340.

In the embodiment shown in FIG. 5A and FIG. 5B, four driving electrode sets 225A to 225D are charged in step 310, and four driving electrodes 220 of the second driving electrode set 225B are charged in step 330. It only takes eight unit times to perform one location calculation (or one location reporting), which is faster than sixteen unit times in the conventional method of FIG. 1.

Figure 6A:
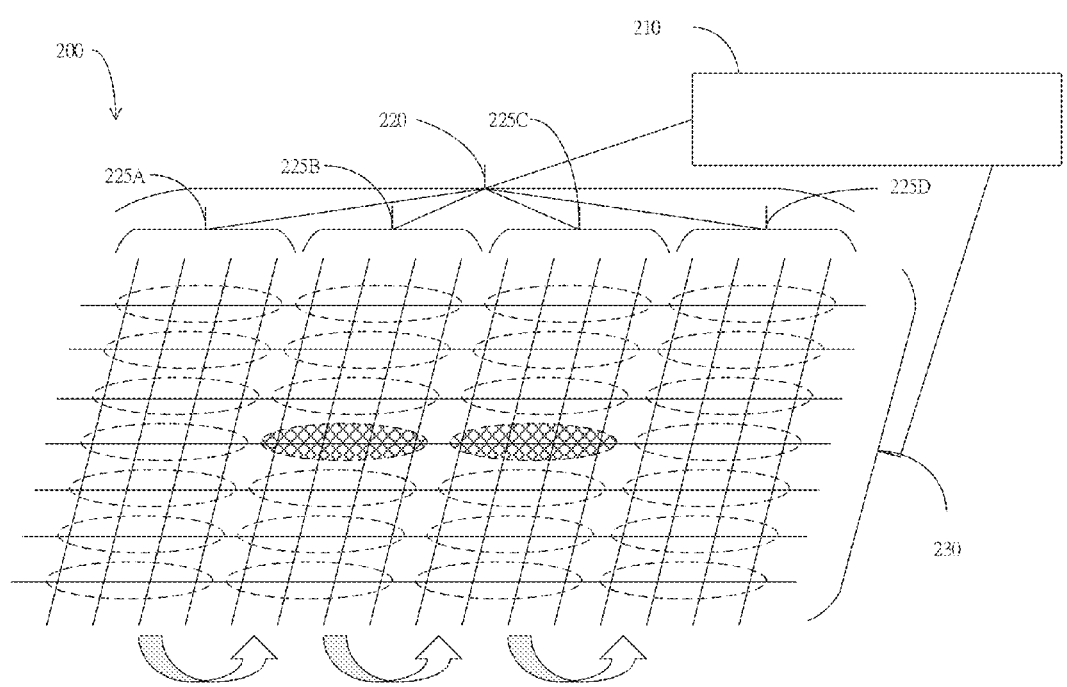
FIG. 6A and FIG. 6B are perspective views of one embodiment of the present invention.
Figure 6B:
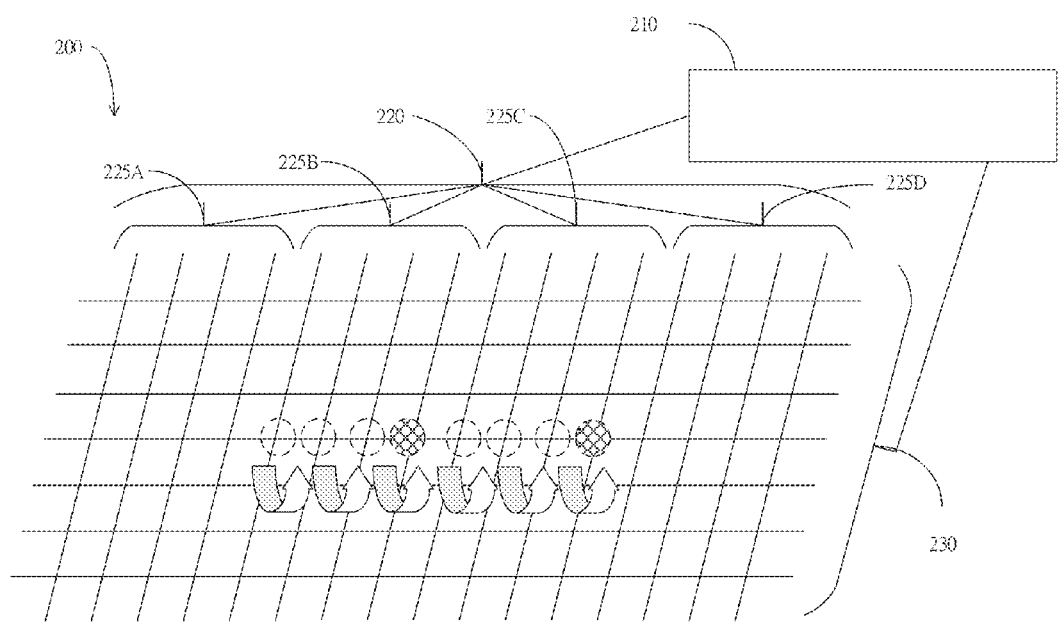

Please refer to FIG. 6A and FIG. 6B, which are perspective views of one embodiment of the present invention. When the electrical change is detected while charging the second and the third driving electrode sets 225B and 225C in step 310, the touch sensing apparatus 210 sequentially charges eight driving electrodes 220 of the second and the third driving electrode sets 225B and 225C in step 330, as shown in FIG. 6B. The touch locations of two external conductive objects can therefore be determined in step 340 according to the electrical change.

In the embodiment shown in FIG. 6A and FIG. 6B, four driving electrode sets 225A to 225D are charged in step 310, and eight driving electrodes 220 of the second and third driving electrode sets 225B and 225C are charged in step 330. It only takes twelve unit times to perform one location calculation (or one location reporting), which is also faster than sixteen unit times in the conventional method of FIG. 1.

Figure 6C:
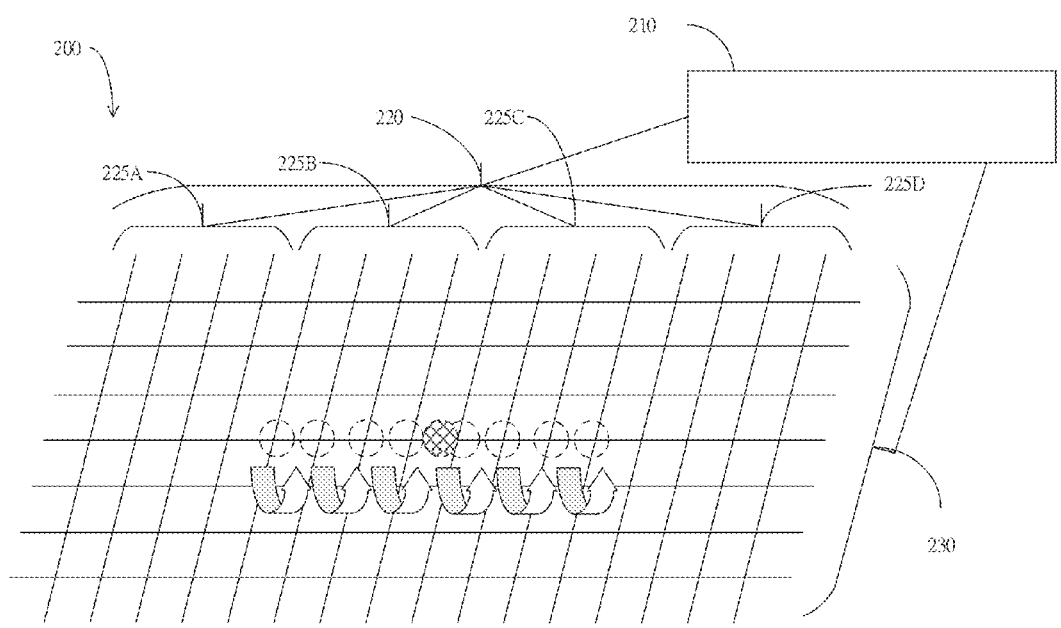
FIG. 6C is a perspective view of one embodiment of the present invention.

Please refer to FIG. 6A and FIG. 6C, where FIG. 6C is a perspective view of one embodiment of the present invention. The embodiment of FIG. 6C is different from that of FIG. 6B in the touch locations of the external conductive object. In FIG. 6C, the external conductive object is located between two driving electrode sets. After the touch sensing apparatus 210 completes step 330 and step 340, the touch location of the external conductive object, which is between the second and the third driving electrode sets 225B and 225C, can be determined. Similarly, it takes twelve unit times to perform one location calculation (or one location reporting), which is also faster than sixteen unit times in the conventional method of FIG. 1

From the above-mentioned embodiments, the touch sensing system 200 is capable of determining the touch locations, e.g. the locations of multiple external conductive objects. Yet in the scenario of single touch point sensing, the touch sensing system 200 could provide even faster location reporting rate.

Figure 7A:
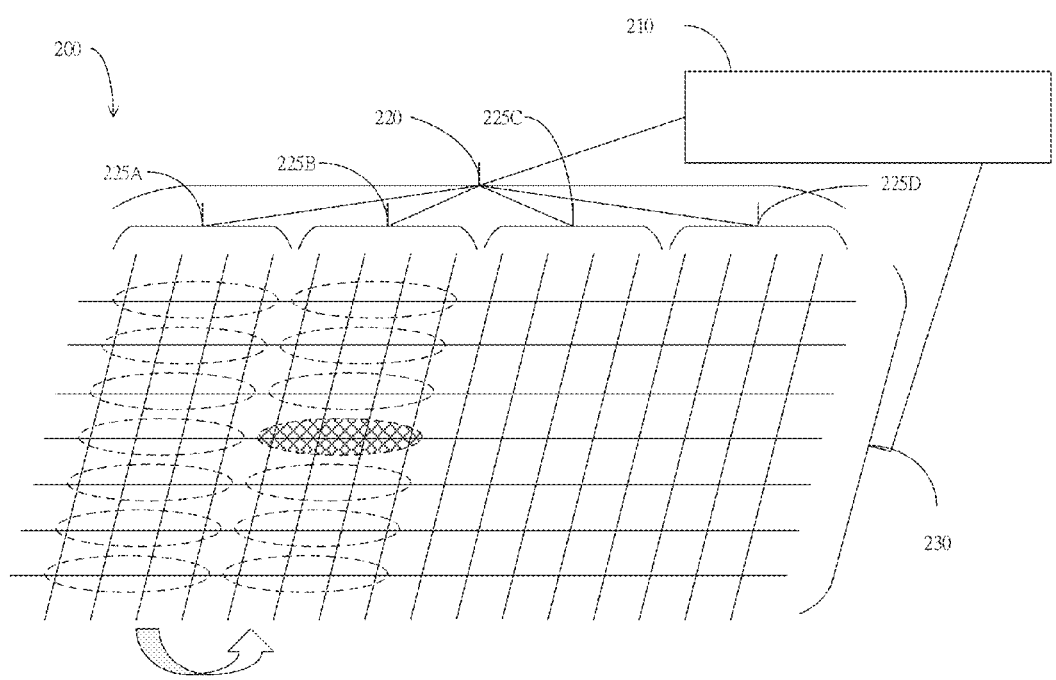
FIG. 7A and FIG. 7B are perspective views of one embodiment of the present invention.
Figure 7B:
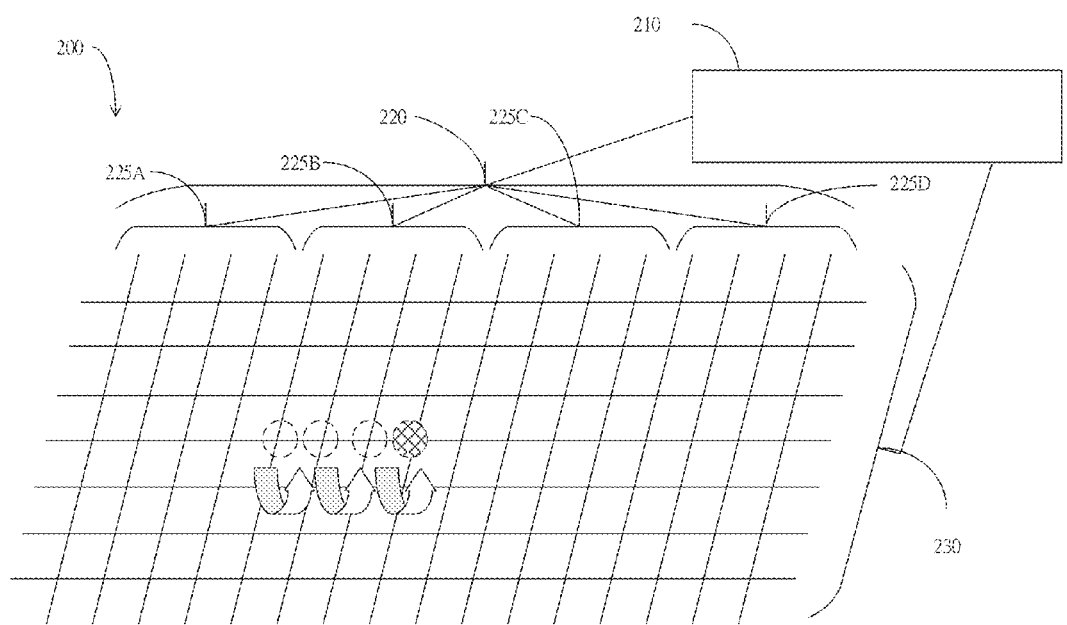

Please refer to FIG. 7A and FIG. 7B, which are perspective views of one embodiment of the present invention. The difference between the embodiments shown in FIG. 7A and FIG. 4A is that all the four driving electrode sets 225A to 225D are charged in the embodiment of FIG. 4A, whereas the electrical change is detected merely until the second driving electrode set 225B is charged in the embodiment of FIG. 7A. This means that during single touch sensing, when the external conductive object is located near the second driving electrode set 225B, the following driving electrode sets 225C and 225D need not to be charged. Therefore, the touch sensing apparatus 210 omits the steps of charging the third and the fourth driving electrode sets 225C and 225D, and directly goes down to the step of sequentially charging the four driving electrodes 220 in the second driving electrode set 225B as shown in FIG. 7B. In other words, the touch sensing apparatus 210 suspends charging the rest not-yet-charged driving electrode sets 225C and 225D. As a result, because only two driving electrode sets 225A and 225B and four driving electrodes 220 are charged in the present embodiment, it takes only six unit times to perform one location calculation (or one location reporting), which is faster than sixteen unit times in the conventional method of FIG. 1.

Figure 8:
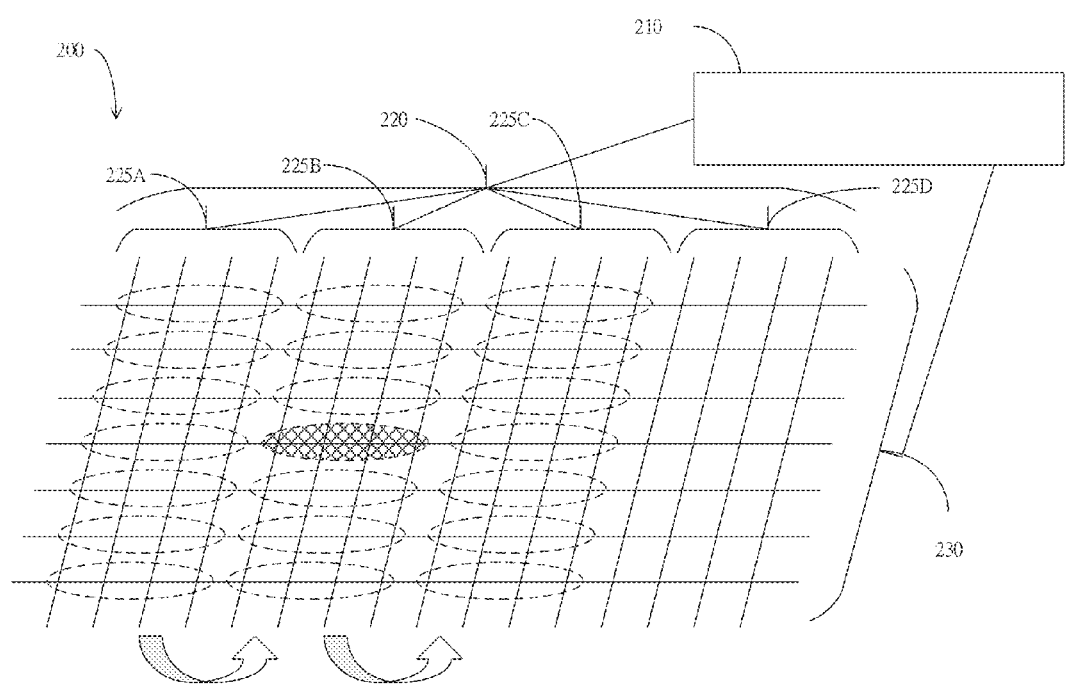
FIG. 8 is a perspective view of one embodiment of the present invention.

Please refer to FIG. 8 and FIG. 7B, where FIG. 8 is a perspective view of one embodiment of the present invention. Although the electrical change is detected when the second driving electrode set 225B is charged, there still lies the possibility of the single conductive object located between the second and the third driving electrode sets 225B and 225C. Therefore, the touch sensing apparatus 210 here only omits the step of charging the fourth driving electrode set 225D, which means the step of charging the third driving electrode set 225C is still performed.

When the electrical change is not detected as the third driving electrode set 225C is charged, it means the single external conductive object is located within the range of the second driving electrode set 225B and not located between the second and the third driving electrode sets 225B and 225C. Therefore, as shown in FIG. 7B, the touch sensing apparatus 210 directly charges the four driving electrodes 220 of the second driving electrode set 225B sequentially. In the present embodiment, because only three driving electrode sets 225A, 225B and 225C and four driving electrodes 220 are charged, it only takes seven unit times to perform one location calculation (or one location reporting), which is faster than sixteen unit times in the conventional method of FIG. 1.

Figure 9A:
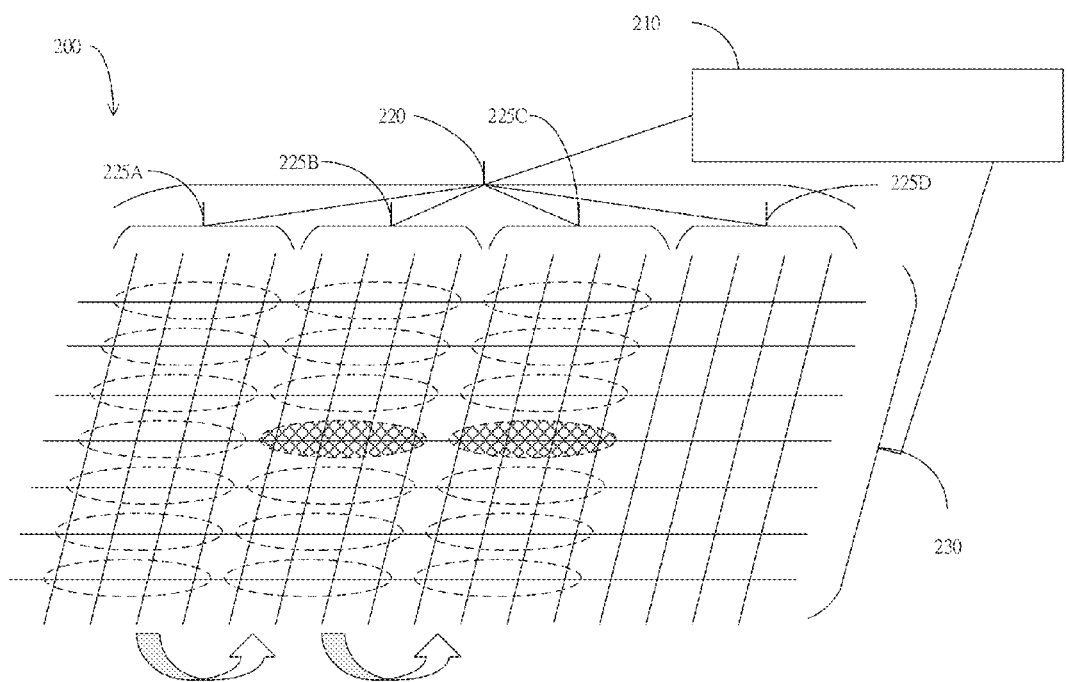
FIG. 9A and FIG. 9B are perspective views of one embodiment of the present invention.
Figure 9B:
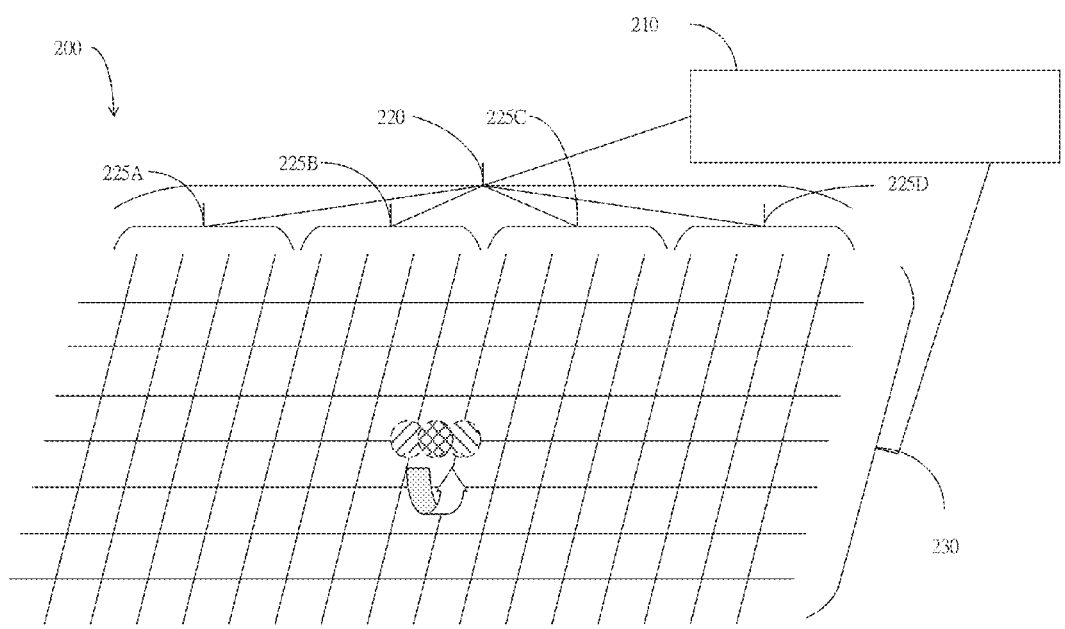

Please refer to FIG. 9A and FIG. 9B, which are perspective views of one embodiment of the present invention. The difference between the embodiments shown in FIG. 9 and FIG. 8 is that the electrical change is detected when the third driving electrode set 225C is charged as the touch sensing apparatus 210 omits the step of charging the fourth driving electrode set 225D. This means that the external conductive object is located between the second and the third driving electrode sets 225B and 225C. Therefore the touch sensing apparatus 210 only charges the last driving electrode 220 in the second driving electrode set 225B and the initial driving electrode 220 in the third driving electrode set 225C, as shown in FIG. 9B. The location of the external conductive object can be determined accordingly. In the present embodiment, because only three driving electrode sets 225A, 225B and 225C and two driving electrodes 220 are charged, it only takes five unit times to perform one location calculation (or one location reporting), which is faster than sixteen unit times in the conventional method of FIG. 1.

In yet another embodiment of the present invention, the touch sensing apparatus 210 charges multiple last driving electrodes 220 in the second driving electrode set 225B and multiple initial electrodes 220 in the third driving electrode set 225C. For instance, it charges the two last driving electrodes 220 in the second driving electrode set 225B and the two initial driving electrodes 220 in the third driving electrode set 225C, so as to determine the location of the external conductive object. In this embodiment, because only three driving electrode sets 225A, 225B, and 225C and four driving electrodes 220 are charged, it takes only seven unit times to perform one location calculation (or one location reporting), which is faster than sixteen unit times in the conventional method of FIG. 1. Furthermore, since the number of the driving electrodes 220 in each of the driving electrode sets 225A to 225D is adjustable in accordance with the needs of different embodiments, the touch sensing apparatus 210 could adjust the number of the last and the initial driving electrodes 220 which are being driven in the prior driving electrode set (e.g. the second one 225B) and the following driving electrode set (e.g. the third one 225C). Additionally, although the numbers of the first and the last driving electrodes 220 are the same in the previously mentioned embodiment, the numbers could also be different from each other.

Generally, the mutual capacitance touch sensitive sensing apparatus and system and method thereof according to the embodiments of the present invention, have the merits including but not limited to scanning the touch sensing region in a time shorter than the conventional line-by-line scanning method, and reporting the touch location in a faster rate.

It will be apparent to those who are skilled in the art that various modifications and variations can be made to the embodiments of the present invention without departing from the scope or spirit of the present invention. In view of the foregoing, it is intended that the modifications and variations derived from the embodiments provided in the present invention are still regarded as falling within the scope of the following claims.

What is claimed is:

1. A mutual capacitance touch sensing method, comprising:
    sequentially charging a plurality of driving electrode sets and detecting the electrical change of a plurality of sensing electrodes, wherein each driving electrode set comprises a plurality of driving electrodes;
    when a first driving electrode set is charged and the electrical change of at least one of the sensing electrodes is detected, sequentially charging the driving electrodes in the first driving electrode set and detecting the electrical change of the sensing electrodes; and
    determining a touch location according to the detected electrical change of the sensing electrodes when the driving electrodes in the first electrode set are sequentially charged.

2. The mutual capacitance touch sensing method of claim 1, further comprising:
    when a second driving electrode set is charged and the electrical change of at least one of the sensing electrode is detected, sequentially charging the driving electrodes in the second driving electrode set and detecting the electrical change of the sensing electrodes; and
    determining a touch location according to the detected electrical change of the sensing electrodes when the driving electrodes in the first and the second driving electrode sets are sequentially charged.

3. The mutual capacitance touch sensing method of claim 2, wherein the electrical change is caused by at least one external conductive object and the at least one external conductive object is located between the first and the second driving electrode sets, and the first driving electrode set is adjacent to the second driving electrode set.

4. The mutual capacitance touch sensing method of claim 2, when used for detecting a single external conductive object, further comprising:
    suspending charging the rest not-yet-charged driving electrode sets when the second driving electrode set is charged and the electrical change of said at least one sensing electrode is detected, wherein the electrical change of said at least one sensing electrode is caused by the external conductive object approaching or touching the second driving electrode set.

5. The mutual capacitance touch sensing method of claim 2, wherein the steps of sequentially charging the driving electrodes in the first driving electrode set, sequentially charging the driving electrodes in the second driving electrode set, and detecting the electrical change of the sensing electrodes are performed after the step of sequentially charging the driving electrode sets and detecting the electrical change of the sensing electrodes.

6. The mutual capacitance touch sensing method of claim 1, when used for detecting a single external conductive object, further comprising:
    suspending charging the rest not-yet-charged driving electrode sets when the first driving electrode set is charged and the electrical change of said at least one sensing electrode is detected, wherein the electrical change of said at least one sensing electrode is caused by the external conductive object approaching or touching the first driving electrode set.

7. The mutual capacitance touch sensing method of claim 6, further comprising:
    respectively charging the last driving electrode of the first driving electrode set and the initial driving electrode of the driving electrode set next to the first driving electrode set;
    detecting the electrical change of said at least one sensing electrode.

8. The mutual capacitance touch sensing method of claim 6, further comprising:
    respectively charging a plurality of the last driving electrodes of the first driving electrode set and a plurality of the initial driving electrodes of the driving electrode set next to the first driving electrode set,
    detecting the electrical change of said at least one sensing electrode.

9. The mutual capacitance touch sensing method of claim 1, wherein the step of sequentially charging the driving electrodes in the first driving electrode set and detecting the electrical change of the sensing electrodes is performed after the step of sequentially charging the driving electrode sets and detecting the electrical change of the sensing electrodes.

10. A mutual capacitance touch sensing apparatus, for detecting a touch location on a mutual capacitance touch panel, wherein the mutual capacitance touch panel comprises a plurality of driving electrode sets and a plurality of sensing electrodes corresponding to the driving electrode sets, and each one of the driving electrode set comprises a plurality of driving electrodes, and the mutual capacitance touch sensing apparatus comprises a sensing module connecting to the driving electrode sets and the sensing electrodes, wherein the sensing module performs the steps comprising:
    sequentially charging the driving electrode sets and detecting the electrical change of the sensing electrodes;
    when a first driving electrode set is charged and the electrical change of at least one of the sensing electrodes is detected, sequentially charging the driving electrodes in the first driving electrode set and detecting the electrical change of the sensing electrodes; and
    determining the touch location according to the detected electrical change of the sensing electrodes when the driving electrodes in the driving electrode set are sequentially charged.

11. The mutual capacitance touch sensing apparatus of claim 10, wherein the sensing module further performs the steps comprising:
    when a second driving electrode set is charged and the electrical change of at least one of the sensing electrodes is detected, sequentially charging the driving electrodes in the second driving electrode set and detecting the electrical change of the sensing electrodes; and
    determining the touch location according to the detected electrical change of the sensing electrodes when the driving electrodes in the first and the second driving electrode sets are sequentially charged.

12. The mutual capacitance touch sensing apparatus of claim 11, wherein the electrical change is caused by at least one external conductive object and the at least one external conductive object is located between the first and the second driving electrode sets, and the first driving electrode set is adjacent to the second driving electrode set.

13. The mutual capacitance touch sensing apparatus of claim 11, when used for detecting a single external conductive object, the sensing module further performs the steps comprising:

suspending charging the rest not-yet-charged driving electrode sets when the second driving electrode set is charged and the electrical change of said at least one sensing electrode is detected, wherein the electrical change of said at least one sensing electrode is caused by the external conductive object approaching or touching the second driving electrode set.

14. The mutual capacitance touch sensing apparatus of claim 11, wherein the steps of sequentially charging the driving electrodes in the first driving electrode set, sequentially charging the driving electrodes in the second driving electrode set, and detecting the electrical change of the sensing electrodes are performed after the step of sequentially charging the driving electrode sets and detecting the electrical change of the sensing electrodes.

15. The mutual capacitance touch sensing apparatus of claim 10, when used for detecting a single external conductive object, the sensing module further performs the steps comprising:

suspending charging the rest not-yet-charged driving electrode sets when the first driving electrode set is charged and the electrical change of said at least one sensing electrode is detected, wherein the electrical change of said at least one sensing electrode is caused by the external conductive object approaching or touching the first driving electrode set.

16. The mutual capacitance touch sensing apparatus of claim 15, wherein the sensing module further performs the steps comprising:

respectively charging the last driving electrode of the first driving electrode set and the initial driving electrode of the driving electrode set next to the first driving electrode set; and detecting the electrical change of said at least one sensing electrode.

17. The mutual capacitance touch sensing apparatus of claim 15, wherein the sensing module further performs the steps comprising:

respectively charging a plurality of the last driving electrodes of the first driving electrode set and a plurality of the initial driving electrodes of the driving electrode set next to the first driving electrode set;

detecting the electrical change of said at least one sensing electrode.

18. The mutual capacitance touch sensing apparatus of claim 10, wherein the step of sequentially charging the driving electrodes in the first driving electrode set and detecting the electrical change of the sensing electrodes is performed after the step of sequentially charging the driving electrode sets and detecting the electrical change of the sensing electrodes.

19. A mutual capacitance touch sensing system, comprising:

a mutual capacitance touch panel comprising a plurality of driving electrode sets and a plurality of sensing electrodes corresponding to the driving electrode sets, and each one of the driving electrode set comprising a plurality of driving electrodes; and a mutual capacitance touch sensing apparatus for detecting a touch location on the mutual capacitance touch panel, wherein the mutual capacitance touch sensing apparatus comprises a sensing module connecting to the driving electrode sets and the sensing electrodes, wherein the sensing module performs the steps comprising:

sequentially charging the driving electrode sets and detecting the electrical change of the sensing electrodes;

when a first driving electrode set is charged and the electrical change of at least one of the sensing electrodes is detected, sequentially charging the driving electrodes in the first driving electrode set and detecting the electrical change of the sensing electrodes; and determining the touch location according to the detected electrical change of the sensing electrodes when the driving electrodes in the first driving electrode set are sequentially charged.

\* \* \* \* \*